Feb. 14, 1961 G. V. IRELAND 2,971,477
RAILROAD CAR AXLE-GENERATOR SYSTEM AND SUSPENSION THEREFOR
Filed Aug. 20, 1959 12 Sheets-Sheet 1
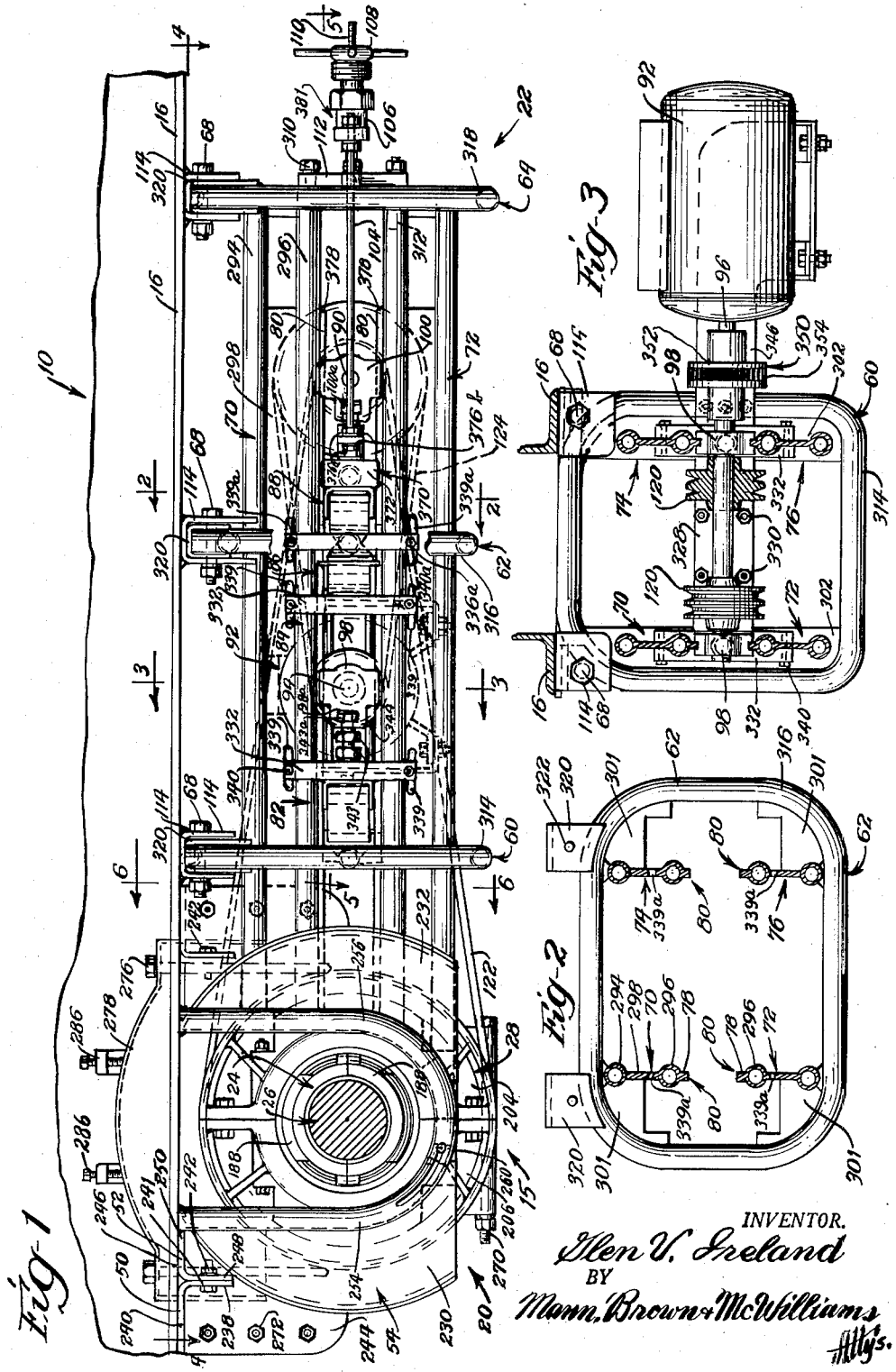
INVENTOR.
Glen V. Ireland
BY
Mann, Brown & McWilliams
Attys.

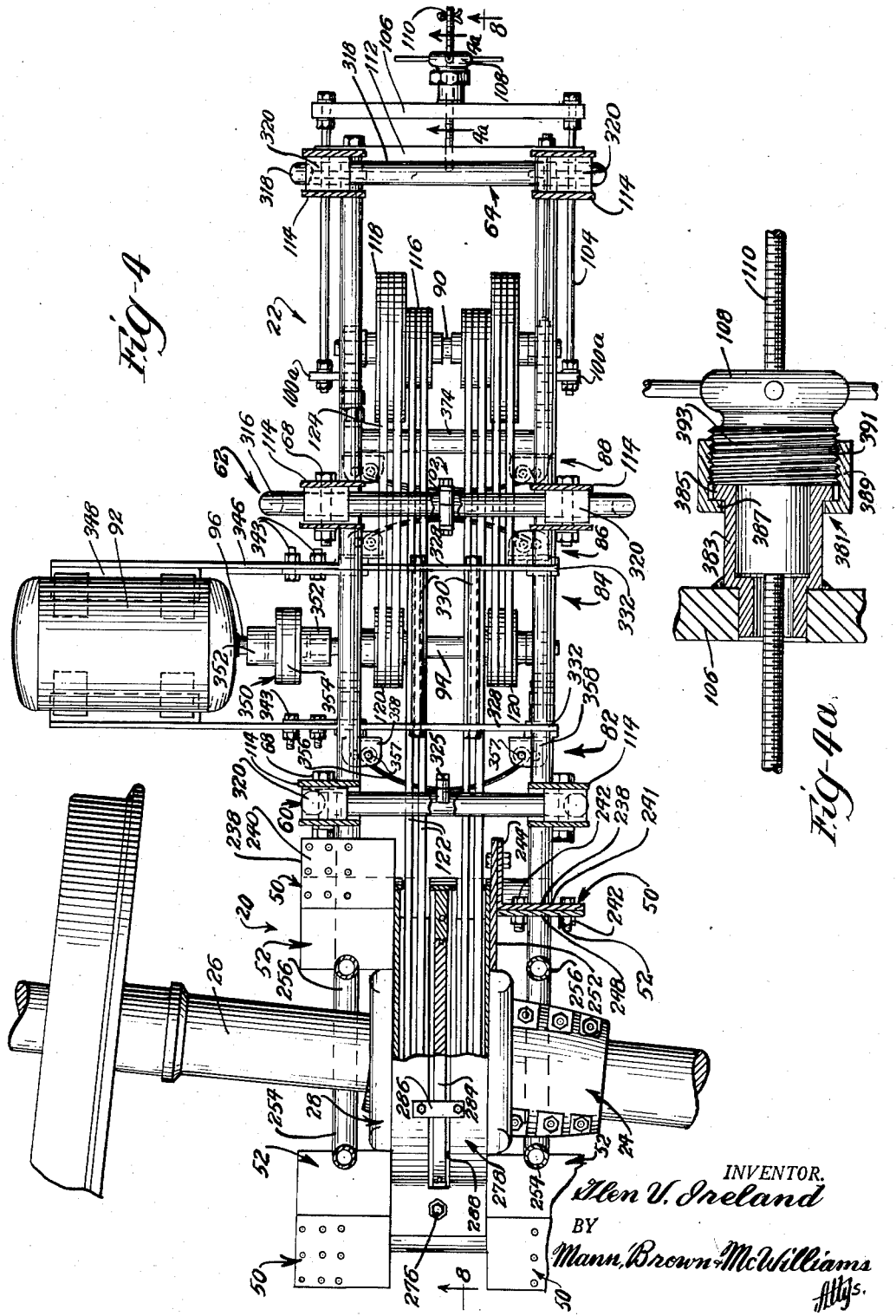

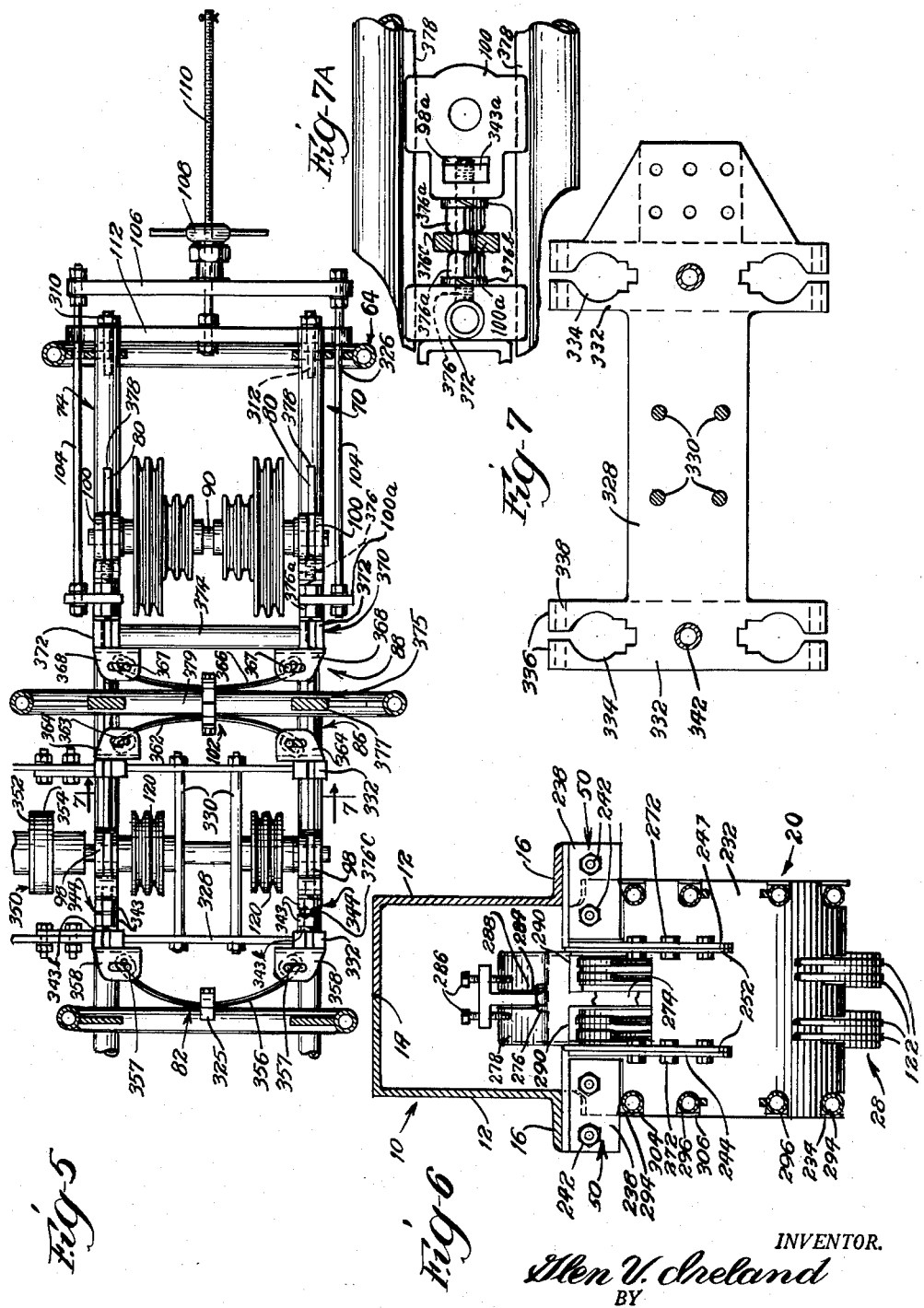

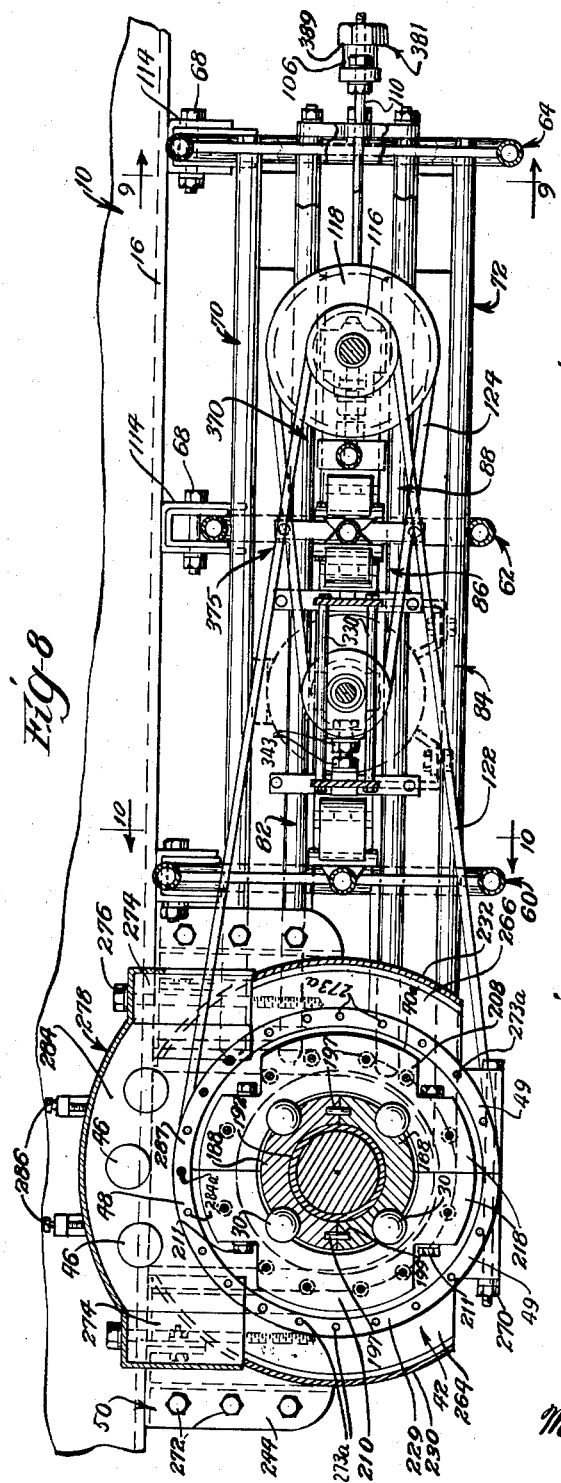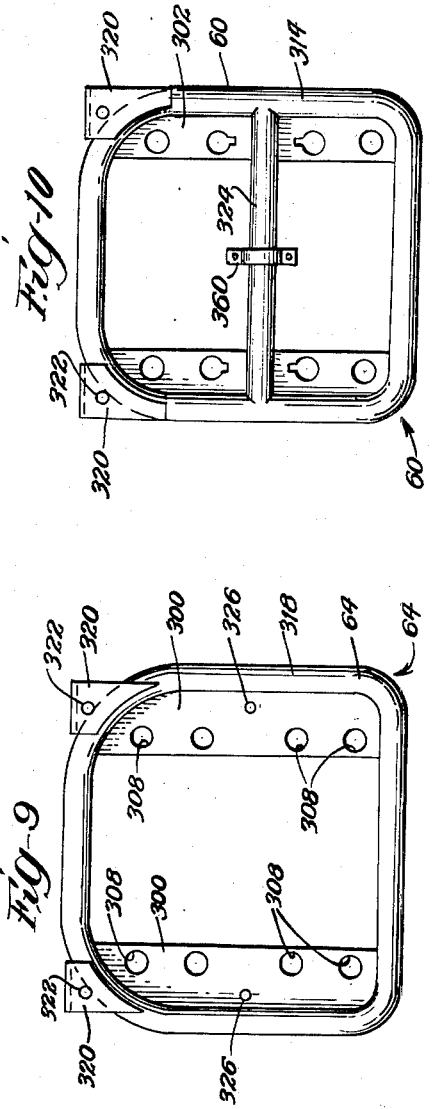

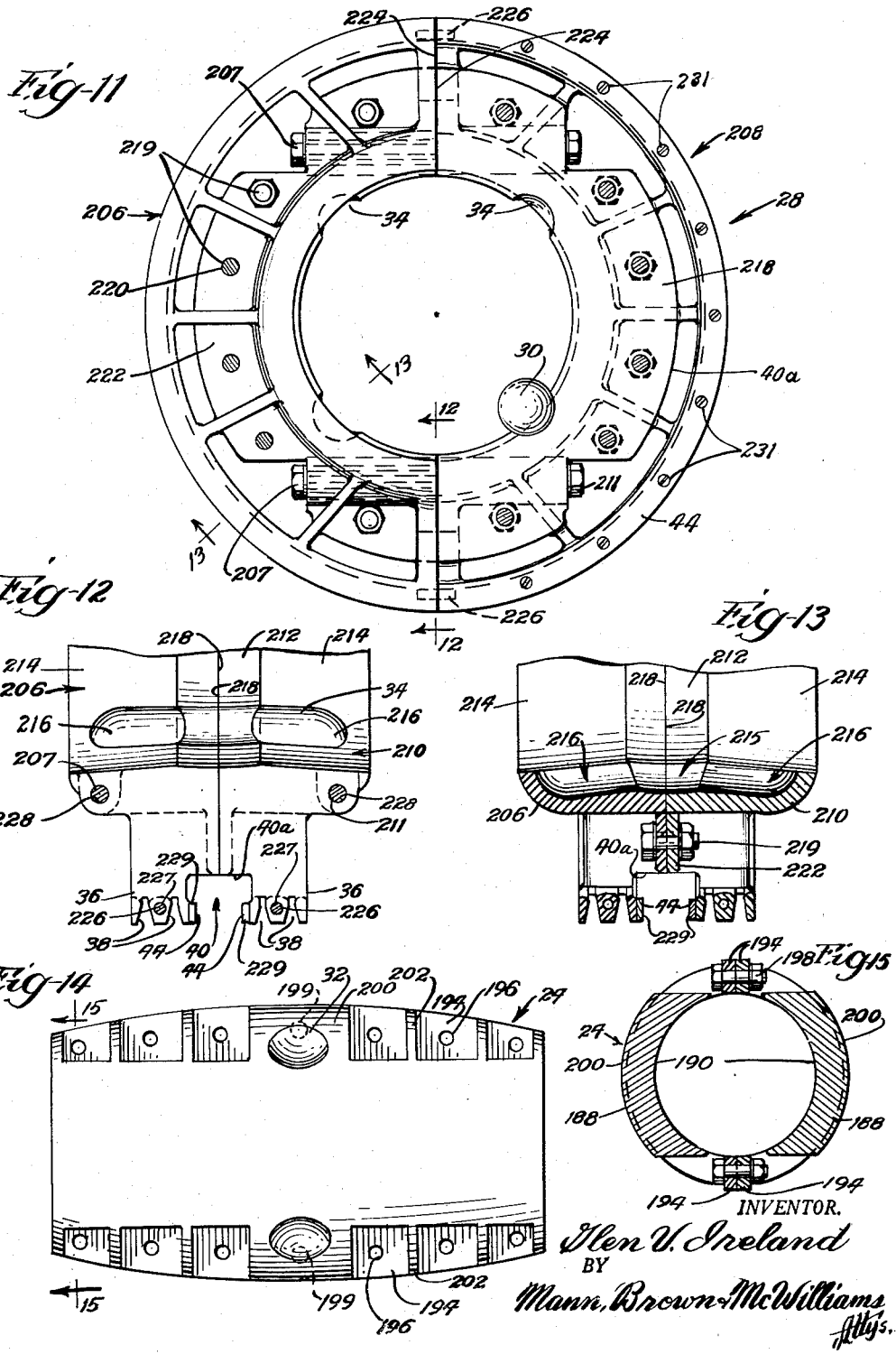

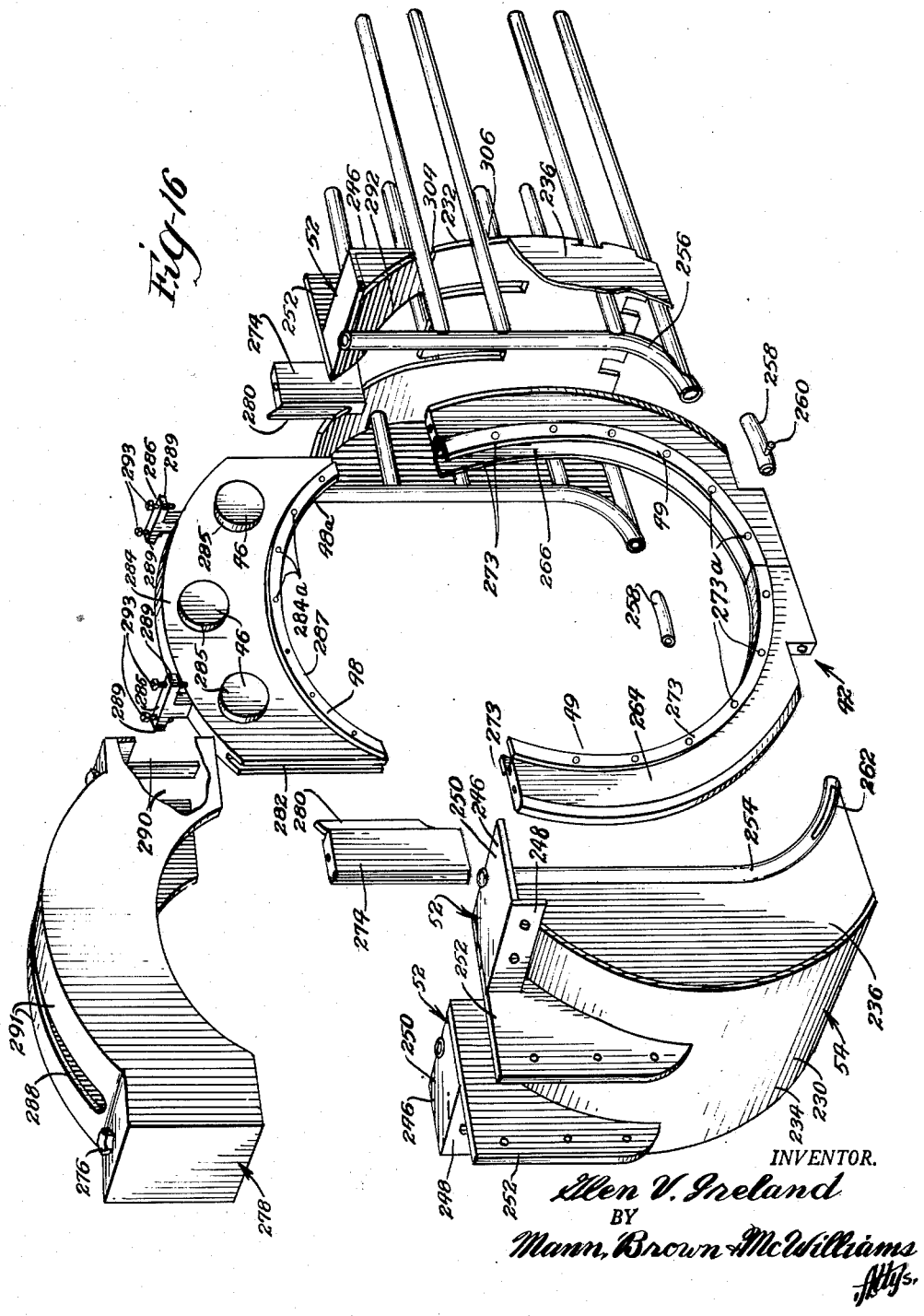

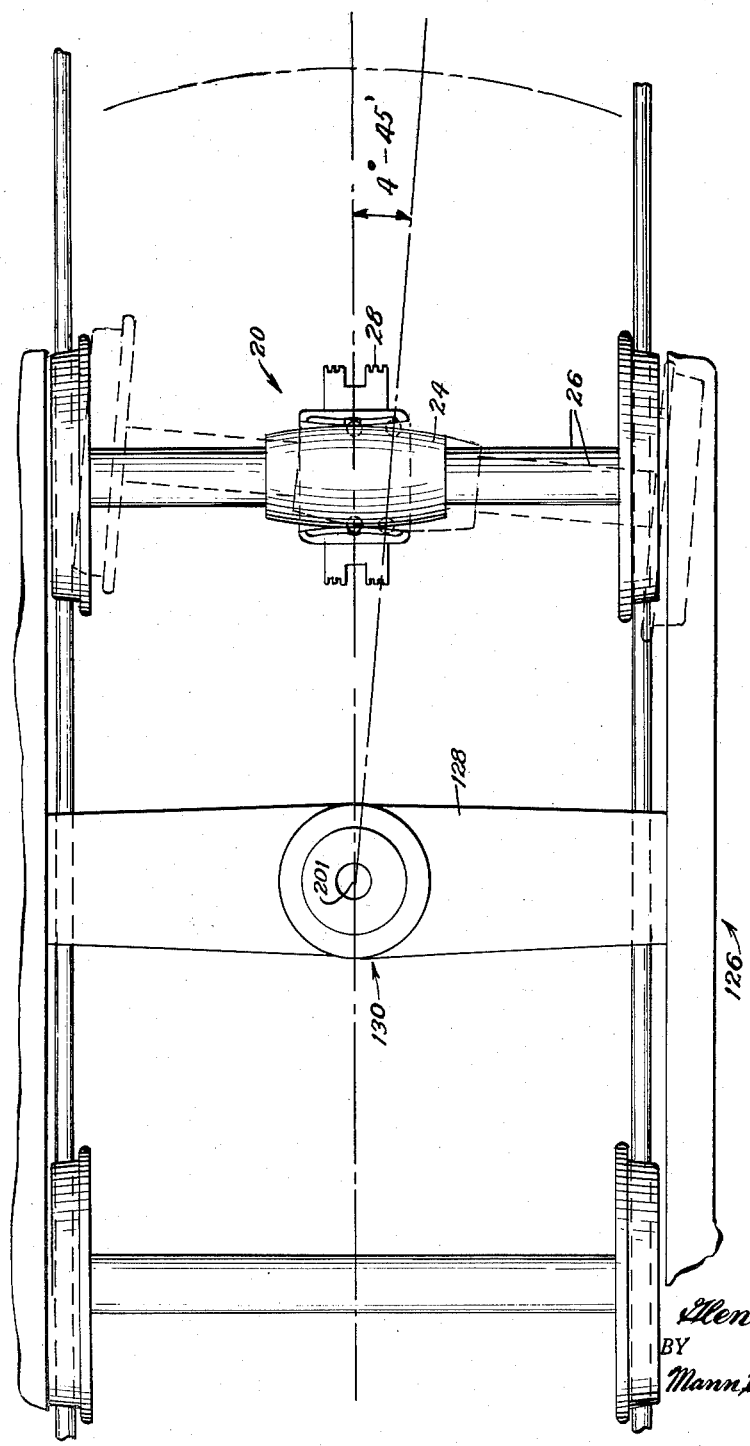

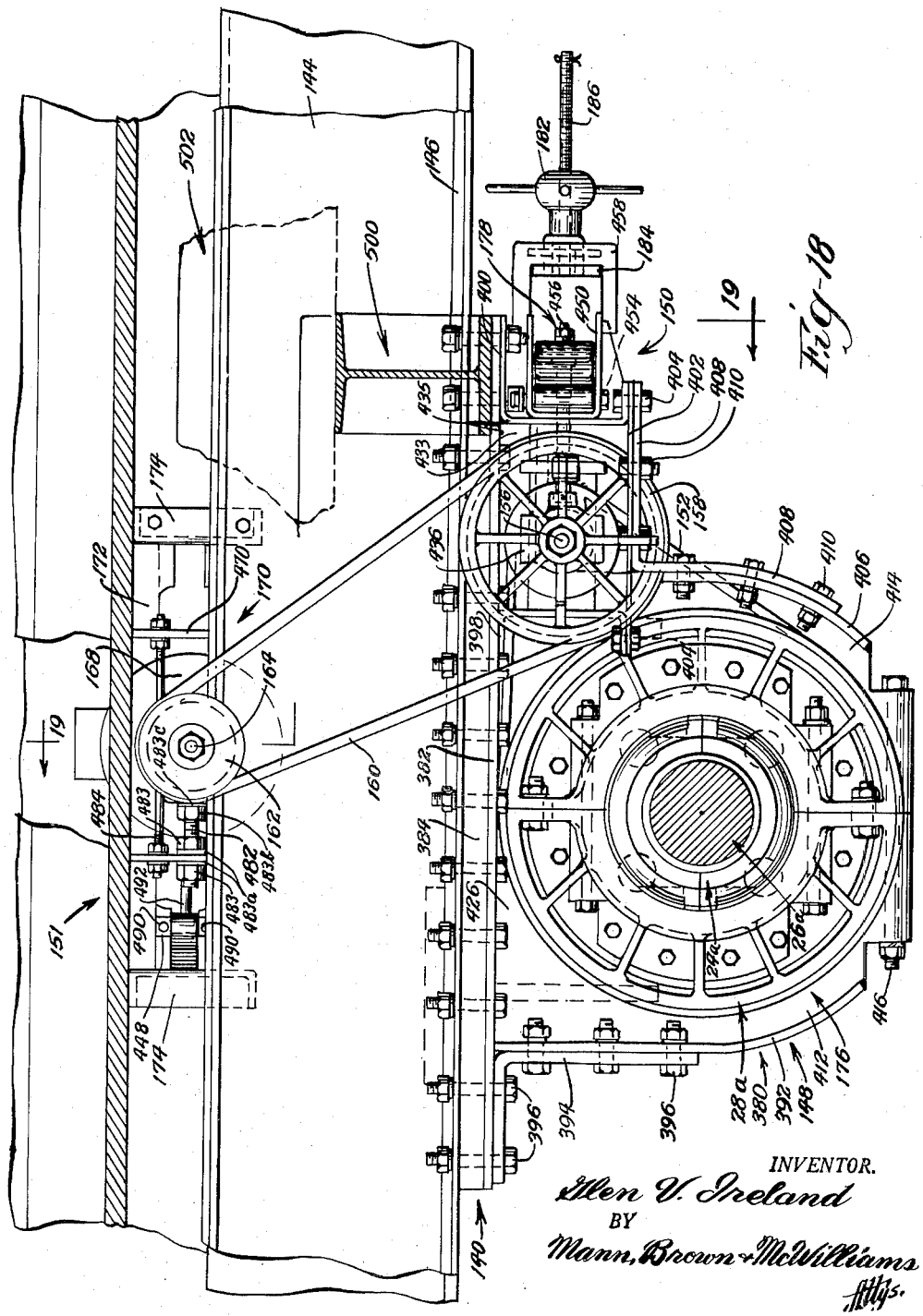

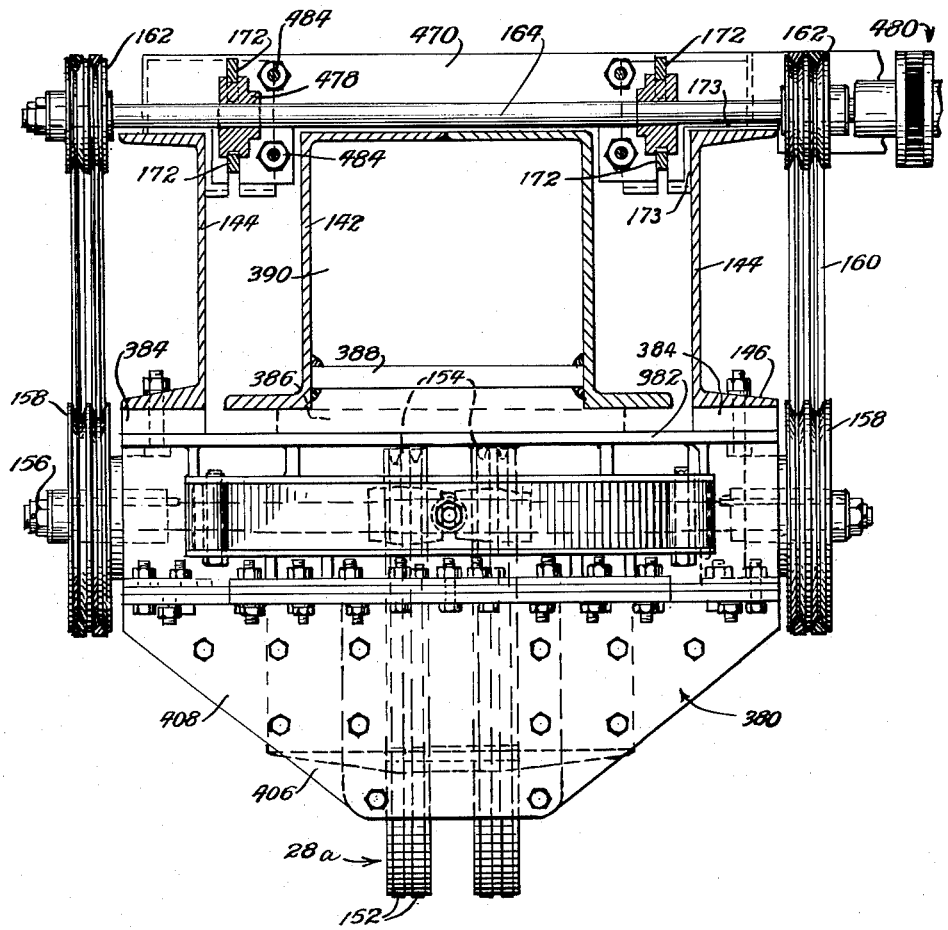

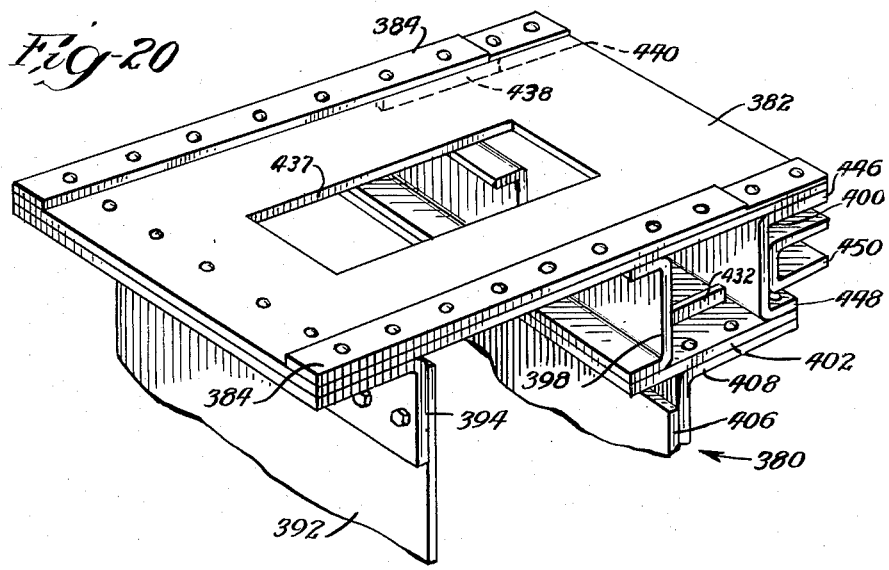
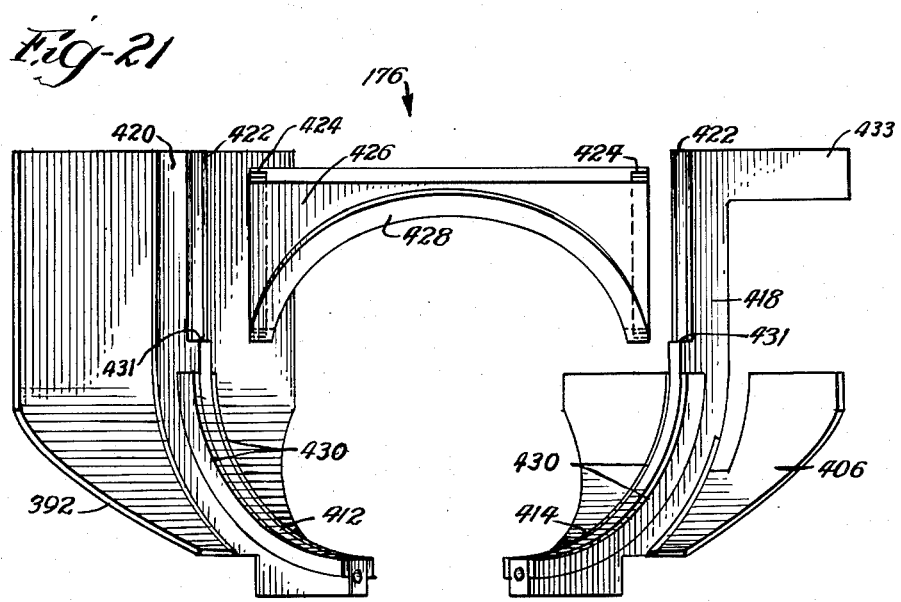

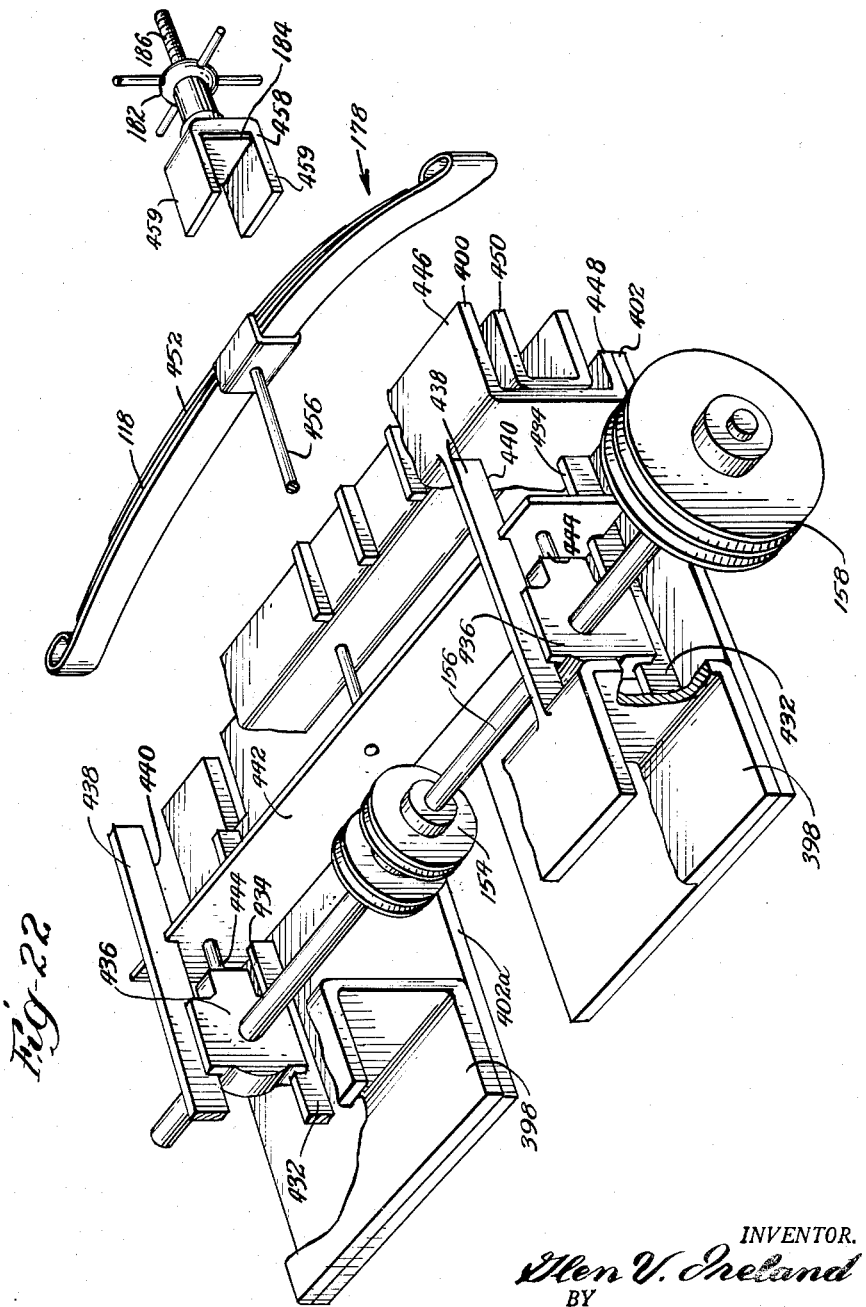

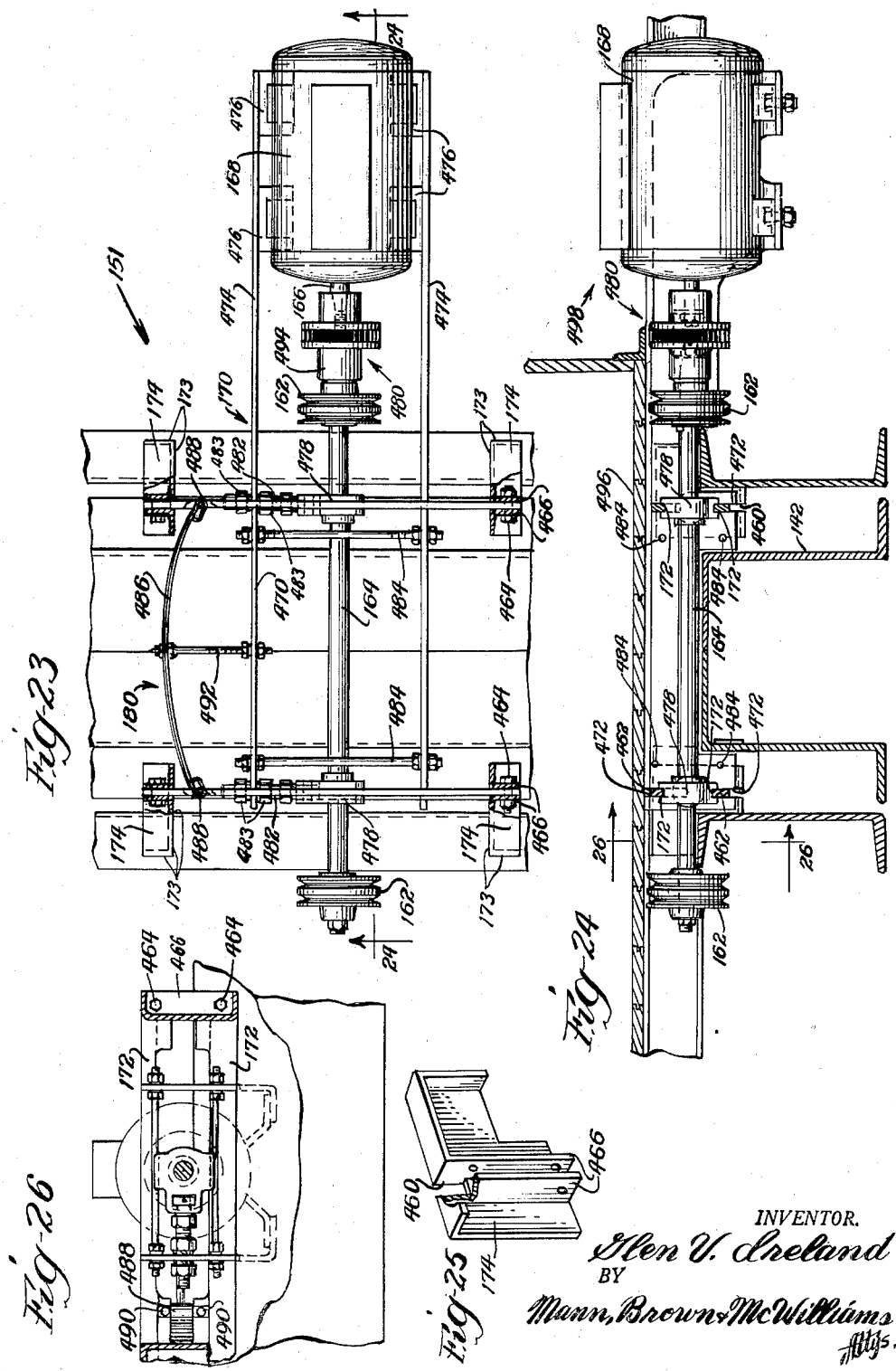

United States Patent Office 2,971,477
Patented Feb. 14, 1961

2,971,477

RAILROAD CAR AXLE-GENERATOR SYSTEM AND SUSPENSION THEREFOR

Glen V. Ireland, 6605 W. Bennett Ave., Milwaukee, Wis.

Filed Aug. 20, 1959, Ser. No. 835,122

9 Claims. (Cl. 105—133)

My invention relates to a railroad car axle-generator system and suspension therefor, and more particularly, to an axle-generator drive and generator support arrangement that is adapted for application to all situations where axle generator systems are employed.

Electric power is almost universally employed for the lighting of passenger train cars, cabooses, mail cars and the like, as well as for air conditioning systems and a variety of other services such as electric brake control, radio and public address systems, etc. The power supply is usually provided by the so-called axle-generator system wherein a generator carried by the car is driven by a truck axle through suitable belting or the like.

An axle generator system for electric light use may comprise the following principal parts or components: A generator secured to the underside of a car body; a suspension by which the generator is supported; a drive, connecting the generator armature shaft to the driving axle; a regulator for controlling the voltage and output of the generator at all train speeds; an automatic switch designed to operate on reverse current for the purpose of preventing discharge of the battery through the generator; and a battery composed of a suitable number of storage cells to insure a constant supply of electric current when the generator is not operating, as when the car is not in motion.

Conventional axle drives for axle-generator systems usually take the form of an endless pulley belt trained over pulleys or sheaves, one of which is keyed to an axle of the railroad car and the other of which is keyed to the generator armature shaft. Since railroad car axles are always associated with and form a part of trucks that pivot with respect to the car body (on negotiating curves and cross-overs), the axle to which the pulley belt drive pulley or sheave is keyed will necessarily swing and move sidewise with respect to the car body. This inevitably results in belt slippage or jumping since the tension in the belt increases as the axle swings away from its normal perpendicular position with respect to the longitudinal center of the car, thereby effecting a stretching action on the belt that not infrequently results in permanent deformation and sometimes untraining of the belt from its pulleys. The untraining action results because of the necessarily resulting misalignment of the belt with respect to its pulleys due to the swinging of the drive axle.

A principal object of this invention is to provide an axle drive for railroad cars in which the driving pulley or sheave that is keyed to the drive axle always remains aligned with the other pulley or sheave that is driven by the belt or other endless connecting member that is trained over them. This insures that a constant tension will be applied to the pulley belt once it is in operating position and that the pulley belt will not be pulled laterally of the pulleys over which it is trained.

Another problem presented by conventional axle-generator drive systems, when employed, for instance, on a caboose, is that freight trains for one reason or another frequently move so slowly that the generator does not turn over sufficiently to perform its function. The result is that untimely battery exhaustion is a frequent occurrence in slow way freights where slow movement is maintained over an extended period of time.

Therefore, another principal object of this invention is to provide an axle-generator system in which the generator not only turns over sufficiently to perform its recharging function at a speed as low as 5 m.p.h., but which also functions to provide the desired recharging action at speeds on the order of 80 m.p.h.

A further objection to conventional axle-generator systems is that they are expensive to maintain and replace as only the more experienced and qualified personnel can be relied upon to properly do what is required. Where help of the proper caliber is not available, attempts by unqualified personnel to repair and replace frequently have resulted in needless damage to this expensive equipment as well as inadequate operation.

Consequently, it is still a further object of this invention to provide a portable suitcase-like generator suspension arrangement which permits easy removal and replacement of the entire unit, or removal and replacement of individual pieces of equipment, depending on the needs of the particular situation.

Other objects of the invention are to provide improved axle-generator systems for both standard and cushion underframe railroad cars, and to provide an axle-generator system that is inexpensive of manufacture, convenient to assemble and install, and readily adapted for use on existing cars without requiring significant changes in the design of the car.

Other objects, uses and advantages will be obvious or become apparent from a consideration of the following detailed description and the application drawings.

In the drawings:

Figure 1 is a side elevational view of a conventional railroad car center sill structure showing one form of my invention as applied to a standard railroad car underframe;

Figure 2 is a view approximately along line 2—2 of Figure 1, but showing only one of the hanger elements of the embodiment of Figure 1;

Figure 3 is a cross-sectional view along line 3—3 of Figure 1, parts being shown in elevation;

Figure 4 is a horizontal cross-sectional view along line 4—4 of Figure 1, some parts being shown in plan and other parts being broken away;

Figure 4a is an enlarged fragmental cross-sectional view along line 4a—4a of Figure 4;

Figure 5 is a horizontal cross-sectional view approximately along line 5—5 of Figure 1, some parts being shown in plan;

Figure 6 is a vertical cross-sectional view approximately along line 6—6 of Figure 1;

Figure 7 is a plan view of one of the sliding elements mounted on the suspension assembly shown in Figure 1;

Figure 7a is a detail view illustrating an arrangement for maintaining the shafts of the suspension assembly in alignment with their tracks;

Figure 8 is a vertical cross-sectional view approximately along line 8—8 of Figure 4;

Figure 9 is a view along line 9—9 of Figure 8, but showing only the hanger element at the end of the suspension assembly;

Figure 10 is a view along line 10—10 of Figure 8, but showing only the hanger element adjacent the generator drive axle;

Figure 11 is an elevational view, partially in section, of the drive sheave structure employed in the embodiment of Figure 1;

Figure 12 is a fragmental plan view of a portion of the sheave structure, the view being approximately along line 12—12 of Figure 11;

Figure 13 is a fragmental cross-sectional view along line 13—13 of Figure 11;

Figure 14 is a plan view of the pinion structure which is fixed to the drive axle and is keyed to the sheave structure of Figure 11;

Figure 15 is a cross-sectional view along line 15—15 of Figure 14;

Figure 16 is an exploded diagrammatic perspective view of the sheave structure guide and housing structures;

Figure 17 is a diagrammatic plan view of a typical railroad car truck illustrating the significance of my drive as applied thereto;

Figure 18 is a fragmental side elevational view of a cushioned underframe having a modified embodiment of my invention applied thereto, parts being shown in section;

Figure 19 is a diagrammatic cross-sectional view approximately along line 19—19 of Figure 18;

Figure 20 is a diagrammatic perspective view of the step up pulley and sheave structure housing support employed in the embodiment of Figure 18;

Figure 21 is a diagrammatic exploded perspective view of the sheave structure guide arrangement employed in the embodiment of Figure 18;

Figure 22 is a fragmental diagrammatic perspective view, partially exploded, illustrating certain components of the step up pulley mounting arrangement employed in the embodiment of Figure 18;

Figure 23 is a plan view of the generator suspension arrangement employed in the embodiment of Figure 18;

Figure 24 is a cross-sectional view approximately along line 24—24 of Figure 23;

Figure 25 is a perspective view of one of the support brackets shown in Figure 23; and Figure 26 is a sectional view approximately along line 26—26 of Figure 24.

*General description*

In the embodiment of Figures 1–16, my invention is applied to a standard railroad car underframe which normally includes the inverted channel-shaped center sill structure 10 (see Figure 6) that is formed by a pair of Z-shaped members 12 welded together as at 14 and is conventionally in alignment with the longitudinal center of the car. The shape of members 12 provides laterally extending flanges 16 that are disposed on either side of the longitudinal center of the car.

My improved axle-generator system 15 that is adapted for use on standard underframes is essentially supported from center sill flanges 16 and comprises an axle pinion and drive sheave assembly 20 and a generator suspension assembly 22 (see Figure 1). The axle pinion and drive sheave assembly includes a segmented pinion structure 24 which is bolted to the center of the drive axle 26, and a segmented sheave structure 28 that is keyed to the pinion structure by ball elements 30 (see Figures 8 and 11) registering in spherical sockets 32 (see Figure 14) formed in the pinion structure and elongate slots 34 (see Figure 12) formed in the sheave structure 28. As is best seen in Figures 12 and 13, the sheave structure 28 is formed with spaced ridges 36 formed to define pulley belt engaging grooves 38 and defining annular space 40 in which a sheave guide assembly 42 (see Figure 16) is received. The sheave structure is provided with hardened wear surfaces 44 which engage with wear surfaces 46, 48 and 49 on either side of the guide structure 42.

The guide assembly 42 is suspended from the car center sill by suitable brackets 50 and 52 which support the sheave structure housing assembly 54 to which the guide assembly 42 is attached. The guide assembly 42 is fixed to the car underframe in alignment with the longitudinal center of the car (see Figure 6), and the sheave structure is therefore centered and maintained in alignment with the longitudinal center of the car regardless of the lateral movement of the drive axle 96.

The generator suspension assembly 22 comprises spaced hanger members 60, 62 and 64 detachably secured to center sill flanges 16 by appropriate bolts 68. Hanger members 60 and 64 support four framing members 70, 72, 74 and 76 (see Figure 2) which are formed as at 78 to define spaced tracks 80.

Slidably mounted on spaced tracks 80 (see Figure 4) is a first spring unit 82, a generator sliding frame or bed 84, spring units 86 and 88, and step up pulley shaft 90. The sliding generator frame 84 supports generator 92 as well as the auxiliary shaft 94 which is coupled to the generator armature shaft 96. Shafts 90 and 94 are journalled in appropriate self-aligning bearings 98 and 100 (see Figures 1 and 5), respectively, which are slidably mounted on tracks 80. Spring units 86 and 88 are connected together by securing device 102 (see Figure 5) and tie rods 104 extend between self-aligning bearings 100 and a cross bar 106 against which engages a threaded hand wheel 108 that is carried by threaded rod 110 fixed to cross bar 112 secured to the hanger member 64.

It will be observed that the generator suspension assembly 22 is a suitcase-like packaging arrangement which may be completely assembled and stored until needed whereupon it is applied by securing same in place to the spaced U-shaped brackets 114 that are fixed to the flanges 16 of center sill 10.

The shafts 90 and 94 have keyed thereto pulleys or sheaves 116, 118 and 120, respectively, appropriate pulley belts 122 being trained over the sheave structure 28 and the sheaves 116 while appropriate pulley belts 124 are trained over sheaves 118 and 120.

When the axle pinion and drive assembly 20 and generator suspension assembly 22 have been applied as shown, the spring units 82, 86 and 88 are placed under sufficient compression by appropriately rotating hand wheel 108 to apply pulley belts 122 and 124. Hand wheel 108 is then rotated in the opposite direction until the shafts 90 and 94 are positioned with respect to each other and to the sheave structure 28, under the biasing action of the spring units, to provide the belt tensioning desired.

In operation, when the car to which the system 15 is attached moves, axle 26 rotates, which rotates sheave structure 28 to turn the step up sheave shaft 90 and the auxiliary generator shaft 94 that is coupled to generator armature shaft 96. The generator 92 is designed in a conventional manner so that when the speed of its armature reaches 700 r.p.m., the generator operates to recharge the batteries carried by the car, and in accordance with this invention, the generator drive is designed to rotate the generator armature at that rate at about 5 m.p.h. The spring units 82 and 86 effect a centering action on the generator sliding bed which together with its rigidity maintains shaft 94 in proper alignment with respect to the pulley belts. As the pulley belts 122 and 124 increase in length while the system 15 is in service, hand wheel 108 is adjusted to permit the spring units to move shafts 90 and 94 with respect to each other and to sheave structure 28 to take up the slack.

Referring to Figure 17, wherein the axle 26, to which the pinion and drive sheave assembly 20 is secured, is shown associated with the diagrammatically illustrated truck structure 126 including bolster 128, as the railroad car to which the invention is applied moves over the railroad track it will encounter curves and crossovers which will cause the axle 26 to move, for instance, from the full line position of Figure 17 to the position indicated by the dashed line position of axle 26. It will be observed that the axle 26 moves on an arc about the center of the bolster center plate structure 130 and consequently the grooves 34 of the sheave structure 28 are proportioned as shown in Figure 13 to accommodate this movement. The angulation shown in dashed lines in Figure 17 is the most that is ever encountered in railroad trackage, since railroad track curves and crossovers are so laid out (19 degree curves are the maximum permitted) and the distance between bolster centers is so designed that trucks 126 will pivot only over a range of about 9½ degrees about the bolster center. This means that grooves 34 must be designated to provide a swinging action of approximately 4¾ degrees to either side of the center of the car. The embodiment of Figures 1 to 16 was designed for a caboose having a distance between bolster centers of 19 feet ½ inch which is the minimum distance encountered in the railroad art. Greater distances between bolster centers result in less truck angularity on curves.

In the embodiment of Figures 18–26, the axle-generator system 140 is applied to a cushioned railroad underframe of the Duryea type, which, as shown in Figure 19 includes a floating center sill or draft and buff column structure 142 moving between auxiliary center sill channels 144 which are fixed to the car body. Channels 144 includes lower flanges 146 to which the axle pinion and sheave assembly 148 and the step up pulley suspension assembly 150 are attached. The generator suspension assembly 151 is mounted above the center sill structure 142 (see Figures 19 and 24).

The axle pinion and drive sheave assembly 148 is generally similar to that of Figure 1 and drives appropriate pulley belts 152 which are trained over appropriate sheaves 154 that are keyed to the step up sheave shaft 156 that is slidably mounted in a manner that is similar to the arrangement of Figure 1. The step up sheave shaft 156 has keyed to its ends appropriate sheaves or pulleys 158 which engage appropriate pulley belts 160 that are also trained over sheaves 162 keyed to auxiliary generator shaft 164 that is coupled to generator armature shaft 166 of an appropriate generator 168 (see Figures 23 and 24). The generator 168 and its auxiliary shaft 164 are mounted on the sliding generator frame 170 that rides on tracks 172 (see Figure 19) fixed between spaced pairs of brackets 174 that are secured to auxiliary center sill channels 144, as by welding at 173.

The operation of the pinion and sheave structure assembly 148 is essentially the same as the corresponding assembly of Figure 1, and the sheaves or pulleys are arranged to produce operation of generator 168 in a manner similar to that described above. The assembly 148 includes a sheave guide assembly 176 (see Figure 21) for maintaining the sheave structure in alignment with the longitudinal center of the car, and pulley belts 152 are tensioned against spring unit 178 (see Figure 22). The pulley belts 160 are tensioned against spring unit 180 (see Figure 23), which also holds the generator sliding frame in the desired position with respect to the pulley belts. If it is desired to remove pulley belts 152 and 160, the rotating collar or wheel 182 (see Figure 18) is actuated to move the square head 184 of threaded rod 186 against spring unit 178 to loosen the bolts 152 and 160.

It will thus be seen that the embodiment of Figures 18–26 provides the essential features of the axle-generator assembly of Figure 1, except that the arrangement has been modified to accommodate the floating function of center sill or draft column 142. Also, the step up pulley suspension assembly and the generator suspension assembly are separably mounted on the cushioned underframe.

*Specific description*

The details of the embodiment of Figures 1–16 will now be described.

*Axle pinion and sheave drive assembly*

The pinion structure 24 (see Figures 14 and 15) is composed of a pair of like rounded segments 188 formed with internal concave surfaces 190 which are generally complementary to the external surface of the axle 26 to which the pinion structure is to be applied. In most instances, axles are formed with tapering external surfaces in which case a suitable covering 192 (see Figure 8), which may take the form of rubber tape or a sectionalized rubber bushing, should be applied to the axle to insure a proper clamping action between the pinion segments 188 and the axle. Sockets 32 in the illustrated embodiment are four in number and are spaced substantially symmetrically about the pinion structure, two on each segment 188; they are preferably flame hardened for maximum wear resistance. Each segment 188 is formed with laterally projecting flanges 194 formed with appropriate holes 196 to receive bolts 198 which secure segments 188 together against axle 26, dowel pins 197 being lodged in the respective recesses 199 of each segment 188 to further brace this pinion structure (see Figures 8 and 14). As seen in Figures 14, 15 and 17, the external surfaces 200 of segments 188 are not only rounded transversely of the pinion structure 24, but also longitudinally thereof, surfaces 200 being struck on a radius extending from the pivotal center 201 of bolster 128.

Sockets 32 may be formed in separate hardened blocks that are applied to the respective segments 188 in any suitable manner.

Flanges 194 of segments 188 may be strengthened by suitable webs 202.

The sheave structure 28 in the illustrated embodiment is made in the form of four similar segments, complementary segments 204 and 206 being secured together by appropriate bolts 207 to form one circular half of the sheave structure, while the other one half thereof is formed by complementary segments 208 and 210 (see Figure 8) secured together by appropriate bolts 211.

The rounded internal surfaces 212 (See Figure 12) of these segments are formed with outwardly diverging portions 214 to better accommodate the swinging movement of the pinion structure 24 with respect to the sheave structure 28 on curves and crossovers. As best shown in Figure 13, the grooves 34, which may be flame hardened to provide maximum wear resistance, at their center portions 215 essentially lie on an arc that is struck on a radius extending from the pivotal center of bolster 128, while their end portions 216 are depressed to form an escape for balls 30 as they tend to be moved toward the bolster, as the portions of the sheave structure housing them rotate toward the bolster, on swinging movement of the pinion to one side of the sheave structure at curves and crossovers. End portions 216 are struck on an equal radius but from the opposite direction. It will thus be seen that there is a universal joint-like coupling between the pinion structure 24 and the sheave structure 28, with balls 30 forming the only contact between these structures (see Figure 8). The respective sheave structure segments are formed with flat or planar abutting surfaces 218 which are secured together by appropriate bolts 219 applied to bolt holes 220 formed in webs or flanges 222. The segments are also formed with abutting surfaces 224 that are secured together by the bolts 207 and 211 applied to bolt holes 228 that extend transversely of the axis of rotation of the sheave structure. Dowel pins 226 may be applied to the recesses 227 of the sheave ridges 36 for properly locating the sheave segments with respect to each other.

The wear surfaces 44 of the sheave structure may be in the form of supplementary hardened steel elements 229 applied (as by appropriate screws 231, see Figure 8) within the annular groove defined by the ridges 36 (see Figure 12).

The drive sheave housing and guide assemblies

The drive sheave housing assembly 54 generally comprises a pair of arcuate members 230 and 232 (see Figure 16) of generally channel-shaped cross-sectional configuration, each including an arcuate wall 234 and spaced side flanges 236. The housing members 230 and 232 are secured to flanges 16 of center sill 10 by said brackets 50 and 52, brackets 50 being fixed to the center sill and brackets 52 being fixed to the respective housing members. As best seen in Figures 1, 4 and 6, there are two brackets 50 for the respective members 230 and 232, and each bracket 50 generally comprises an angle member 238 having one of its flanges 240 fixed to the center sill 10 as by plug welding and the other of its flanges 241 fixed to the bracket 52 by appropriate bolts 242. Each bracket 50 also includes vertical plates 244 fixed in any suitable manner, as by welding, to the flanges 240 and 241 of the respective brackets 50.

The respective brackets 52 each comprise an angle member 246, one flange 248 of which receives the bolts 242 and the other flange 250 of which abuts against the respective flanges 16 of center sill 10. The angle member 246 is fixed to vertical plate 252, as by welding, which is fixed, as by welding, to the respective arcuate walls 234 of the respective housing members 230 and 232.

The housing members 230 and 232 have fixed along the inner edges of their side flanges 236 rigid tubular reinforcing members 254 and 256, respectively. The tubular members 254 of the housing member 230 each receive a tubular segment 258 (see Figure 16) in which a screw 260 is mounted that is received through the respective arcuate slots 262 of tubular members 254. The arcuate segments 258 are struck on the same arc as the lower ends of the tubular members 254 and 256 and when the housing assembly 54 is mounted in position, the segment 258 is disposed within the lower ends of tubular elements 254 and 256 on both sides of the sheave structure, and screw 260 is turned firmly in place. This arrangement rigidly unites the tubular members 254 and 256 on either side of the pinion and sheave assembly 20.

The housing members 230 and 232 have fixed to their inner surfaces the segments 264 and 266 of the lower guide bar structure 268 which forms a part of the sheave structure guide assembly 42. The respective members 264 and 266 are welded or otherwise fixed to the respective walls 234 of members 230 and 232, and are bolted together at their lower ends by appropriate bolts 270.

Thus, when the members 230 and 232 are mounted in position, as by having their brackets 52 fixed to brackets 50 by bolts 242 as well as by bolts 272 that secure plates 244 and 252 together, guide bar segments 264 and 266 are received within the annular space 40 of the sheave structure and are supported therein.

The segments 264 and 266 have secured thereto, as by flat headed screws 273a, hardened wear plates 273 which form wear surfaces 49, and at their upper ends carry segments 274 which are bolted thereto as by appropriate bolts 276 (see Figures 1 and 16) which also secure the housing assembly cap 278 in place across the top of the sheave structure. The segments 274 are each formed with inwardly directed flanges or ridges 280 that are received in grooves 282 of a suspended vertically movable guide bar 284 which is mounted within the annular recess 40 of the sheave structure 28.

The guide bar 284 has secured on each side thereof, as by flat headed screws 284a, hardened wear plates 285 and 287 that form the wear surfaces 46 and 48, respectively, which engage the hardened surfaces 44 of the sheave structure for purposes of holding the sheave structure in alignment with the center line of the car. Guide bar 284 is permitted to move vertically (on the order of two inches) to accommodate the relative vertical movement between axle 26 and the underframe that normally occurs during movement of the railroad car over raised or lowered track or movement of the underframe when the truck springs are compressed. Cap 278 is formed with slot 288 to accommodate upward vertical movement of guide bar 284 with respect to the underframe, bar 284 carrying brackets 286 which extend through slot 288 and include arms 289 that engage the upper surface 291 of the cap to suspend bar 284 within said annular recess 40 of sheave structure 28. Brackets 286 preferably carry adjustment screws 293 to permit vertical adjustment and positioning of the bar 284, so that there will be no contact with webs or flanges 222 of sheave structure 28 when the truck 12, except when the truck rises vertically, as when it moves over raised track, whereupon the sheave structure webs or flanges 222 slide bar 284 upwardly to allow the deflection permitted by the truck springs.

Guide bar 284 is moved upwardly on upward movement of the axle by the engagement of its arcuate undersurface 48a with inner convex surfaces 40a of the sheave structure 28 (see Figures 8, 11 and 12).

As shown in Figures 6 and 16, the cover 278 is slotted as at 290 and the housing member 232 is slotted as at 292 to accommodate pulley belts 122 that extend between the sheave structure 28 and step up sheave shaft 90.

Generator suspension assembly

Turning now to the generator suspension assembly 22, the framing components 70, 72, 74 and 76 are arranged in vertically disposed pairs and each includes spaced tubular members 294 and 296 joined by plates 298. The tracks 80 are fixed to the adjacent elements 296 to form trackways for the equipment supported by the suspension assembly.

The tubular members 294 and 296 and the plates 298 are fixed to hanger members 60, 62 and 64, as by welding, the hanger members being provided with brace plates 300, 301 and 302, respectively, for this purpose. The tubular members 294 and 296 extend beyond the hanger member 60 in the direction of pinion and sheave assembly 20 and are received in appropriate notches 304 and 306 formed in housing member 232; members 294 and 296 are welded to housing member 232 and reinforcing member 256 on both sides of the assembly to reinforce the framing components. At the hanger 64, the tubular members 294 and 296 extend through holes 308 and are secured to the cross bar 112, as by appropriate bolts 310 being fixed in suitable plugs 312 received within the respective members 294 and 296.

The hanger members 60, 62 and 64, as indicated in Figures 2, 5, 9 and 10, each comprise endless tubular members 314, 316 and 318, respectively. The respective tubular members each carry on either side thereof inverted U-shaped brackets 320 which are formed with appropriate holes 322 for receiving bolts 68 that secure these brackets within the respective pairs of inverted U-shaped brackets 114 that are fixed to the flanges 16 of center sill 10 (see Figures 1 and 4).

As indicated in Figure 10, the hanger 60 is provided with a cross bar 324 to which the spring device 82 is secured (see Figure 4) by an appropriate detachable clamp 325 of any suitable design. The flanges 300 of the hanger 64 are formed with appropriate holes 326 to slidably receive the tie rods 104 that are secured to the self-aligning bearing units 100 of the step up sheave shaft 90.

The generator slider frame 84 generally comprises a pair of spaced transom members 328 (one of which is shown in Figure 7) that are rigidly joined together adjacent their centers by bolts 330 and include slide bars 332 which are formed as at 334 to receive the tubular members 296 and tracks 80 of the framing members 70, 72, 74 and 76, respectively. The slide bars 332 are bifurcated as at 336 and formed with appropriate bolt holes 338 to receive appropriate bolts 340 (that extend through appropriate slots 339 formed in plates 298 of framing members 70, 72, 74 and 76, respectively) for further keying the transoms to the framing members of the suspension assembly.

The slide bars 332 of one of the transom members 328 are tapped as at 342 to screw-threadedly receive threaded studs 344 (see Figure 5) which are screw-threadedly received in the self-aligning bearing units 98 of the generator auxiliary shaft 94 and carry locking nuts 343 that are turned against lock washers 343b that are interposed between the slide bars and bearing units, respectively, to hold the said transom member in the desired position of adjustment with respect to bearing units 98. The ends 344a (see Figure 7a) of studs 344 are slipped into a nut pocket 98a (see Figure 1) of the respective units 98, in which are received nuts 343a into which the respective studs 344 are turned. The bolts 330 and the studs 344 uniting transoms 328 provide a rigid framing structure that is securely held in alignment with the track 80.

The transom members 328 have demountably fixed thereto, as by bolts 343, spaced extensions 346 provided with flanges 348 to which the generator 92 is fixed in any suitable manner. The auxiliary shaft 94 is coupled to generator armature shaft 96 by an appropriate form of flexible coupling 350 composed of flanged coupling elements 352 bolted to a resilient disc 354 (see Figures 4 and 5). The sheaves 120 are keyed to the auxiliary shaft 94 in any suitable manner.

The spring unit 82 generally comprises (see Figure 5) an appropriate form of leaf spring 356 secured at its ends to the adjacent transom slide bars 332, as by pins 357 keying them to appropriate retainer brackets 358 welded to the respective slide bars 332. As already mentioned, the leaf spring 356 is secured to cross bar 324 of hanger 60 by an appropriate clamp device 325.

The spring device 86 is generally similar to the spring device 82 and includes leaf spring 362 secured to the adjacent generator frame slide bars 332, as by pins 363 keying the ends thereof to appropriate brackets 364 being welded in place on the respective bars 332. The spring unit 88 is similarly constructed, it being composed of appropriate leaf spring 366 secured at its ends by pins 367 to appropriate brackets 368 fixed to a spring adjustment frame 370. Frame 370 is composed of spaced glide blocks 372 formed with grooves to receive tracks 80 and joined together by cross bar 374. Spring retainer brackets 368 are welded to the respective slide blocks 372. The leaf springs 362 and 366 are secured together by the appropriate releasable double clamp device 102 carried by transom member 375 which includes slide bars 377 that are similar in configuration to slide bars 332 (see Figure 7) and which are joined together by cross bars 379 (see Figure 5). Slide bars 377 engage tracks 80 in the same manner that slide bars 332 do, and their bifurcated ends 336a receive screws 340a which pass through appropriate slots 339a formed in plates 298.

The slide blocks 372 are tapped to receive threaded guide studs 376 that are secured in a manner similar to that shown in Figure 7a to the respective self-aligning bearings 100 of step up sheave shaft 90 and carry nuts 376a that are turned against lock washers 376b, the respective slide blocks 372 and bearing units to hold bearings 100 and shaft 90 square with tracks 80. Studs 376 are similar to studs 344 and are formed with a hex portion 376c (shown in Figure 7a) on which is received a laterally projecting lug 100a (shown in section in Figure 7a) to which tie rods 104 are secured. The opposite ends of studs 344 and 376 are oppositely threaded to facilitate assembly and hex portions 376c are employed to turn them into place. Bearings 100 include nut pockets 98a that receive nuts 343a into which studs 376 are turned to secure them to bearings 100.

As best seen in Figure 1, the tracks 80 terminate at 378 leaving a space between the ends of the track and hanger member 64 for removal of the individual pieces of equipment that are mounted on tracks 80.

The rotatable hand wheel 108 is provided with a manually operated lock device 381 (see Figure 4a) including a tubular member 383 fixed to cross bar 106 as by welding, and having fixed thereto a flange 385 that is adapted to be engaged by a flange 387 of hex-shaped sleeve 389 having its internal surface 391 threaded for engagement with threaded surface 393 of the hand wheel 108. Hand wheel surface 393 is provided with a left hand thread, whereby when sleeve 389 is turned to move to the left of Figure 4a, hand wheel is freed to rotate in either direction to effect movement of connecting rods 104 either to the right or left of Figure 4 (rod 110 having a right hand thread), but when sleeve 389 is turned to the right of Figure 4a, flange 385 is clamped between flange 387 and the end 395 of hand wheel 108 to prevent rotation thereof.

It will thus be seen that after the framing members 70, 72, 74 and 76 have been fixed to the hanger members 60, 62 and 64, respectively, the spring unit 82, the generator frame transoms 328, the shaft 94 and its bearings 98, the spring units 86 and 88, the spring adjustment block 370 and the shaft 90 and its bearings 100 may be consecutively applied to the tracks 80. After the bolts 330 have been secured between the generator frame transoms 328, the studs 344 and 376 have been fixed to the respective slide bars 332 and slide blocks 372, and the spring units 82, 86 and 88 secured as shown in Figure 5, the rotatable hand wheel 108 is operated to move the shafts 90 and 94 to the left of Figures 1 and 4 sufficiently (against the spring units 82, 86 and 88) to permit application of pulley belts 122 and 124. The rotatable hand wheel is then reversed to apply the desired tension to the respective pulley belts after which it is locked against rotation by actuating lock 381 as described above.

During operation of the apparatus 10, the pinion structure 24 transmits the drive to the sheave structure 28, which drives the step up sheave shaft 90 through the engagement of pulley belts 122 with sheaves 116. The auxiliary shaft 94 is driven by the drive transmitted to the pulley belts 124 that are trained over sheaves 118 and 120, respectively. When the sheave structure 28 is given a minimum diameter of 19.3 inches, the sheaves 116 and 120 are given a minimum diameter of 4.94 inches, and the sheaves 118 are given a minimum diameter of 9.93 inches, the generator operation above described is obtained regardless of the direction of movement of the railroad car.

When it is desired to replace or repair any of the equipment on the suspension assembly 22, the entire suspension assembly may be removed merely by removing bolts 68 and disconnecting housing member 232 from the underframe, or the individual pieces of equipment may be withdrawn from the tracks 80, after being disconnected from each other as may be required. Thus, the suspension assembly 22 is in the form of a suitcase-like unit which may be stored in outlying areas until needed and then quickly applied to a railroad car by even the most inexperienced workers. Of course, before the suspension assembly 22 can be removed, the pinion and sheave assembly housing member 232 must be disconnected from the center sill as well as the centering assembly cover 278. The pinion and sheave assembly housing members 230 and 232 are readily detached from the center sill 10 after bolts 270 are removed, cap 278 detached from guide bars 264 and 266, respectively, and tubular members 254 and 256 disconnected, thereby effecting removal of the sheave guide assembly 42, which permits careful inspection and replacement, if necessary, of the pinion structure 24 and the sheave structure 28.

*Details of modified form of invention*

Referring now to the embodiment of Figures 18–26, the pinion and sheave structures 24a and 28a, respectively, of pinion and sheave drive assembly 148 are identical to the corresponding structures 24 and 28 already described, so no further description of these components is believed to be required. The pinion and sheave structures 24a and 28a are shown applied to axle 26a of the usual type.

As best shown in Figures 18, 19 and 20, the housing assembly 380 for the pinion and sheave assembly 148 is fixed to a mounting plate 382 that is bolted between the flanges 146 of the auxiliary channels 144. The plate 382 preferably includes spacers 384 that are interposed between the plate 382 and flanges 146. It may be noted that the customary brace plate 386 that is mounted where indicated in dashed lines in Figure 19 should be removed and replaced by another brace plate 388 that is welded within space 390 defined by center sill 142.

The housing assembly 380 comprises a first arcuate member 392 (see Figure 21) that is fixed to the mounting plate 382 by an appropriate angle bracket 394 secured in place by bolts 396. At the other end of the mounting plate 382 spaced channel members 398 and 400 are fixed, as by employing appropriate bolts or welding, and these channels support the step up sheave shaft mounting plate 402 as by employing appropriate bolts 404. The second arcuate member 406 of housing assembly 380 is fixed to the plate 402 as by an angle member 408 secured in place by appropriate bolts 410.

The arcuate housing members 392 and 406 have fixed adjacent their centers the segments 412 and 414 forming the lower guide member for the sheave structure of assembly 148. Segments 412 and 414 are secured together at their lower ends, as by an appropriate bolt 416. Segments 412 and 414 at their upper ends are formed with rectilinear portions 418 and 420 (see Figure 21) each of which is provided with a vertical flange or ridge 422. The ridges 422 are received in slots 424 of the vertically movable guide bar 426 that is received across the top of the sheave structure within the annular space 40. The guide bar 426, which is movable vertically on the order of two inches to accommodate vertical movement of the axles is provided with wear plates 428 on either side thereof and appropriate wear bar segments 430 are applied to the guide bar segments 412 and 414, all for engagement with the wear surfaces 44 of the axle sheave structure 28a.

Guide bar 426 rests on shoulders 431 of segments 412 and 414 during normal operation of the axle. Segment 414 includes laterally extending extension 433, which is welded or otherwise secured to plate 382 and channel member 400, as at 435 (see Figure 18). Plate 382 is formed with opening 437 to accommodate the movement of guide bar 426.

As shown in Figure 22, the step up sheave shaft mounting plate 402 has fixed thereto a pair of spaced bars 432 forming tracks 434 each of which slidably carries a self-aligning bearing unit 436 that journals shaft 156. The lower surface of mounting plate 382 has secured thereto bars 438 that are positioned directly above and in alignment with the respective bars 432; bars 438 form tracks 440 which also are slidably engaged by the bearing units 436. The bars 432 and 438 also slidably mount a cross plate or transom member 442 which is secured at its ends to the respective bearing units 436 by appropriate bolts 444. The channel member 400 has fixed within its flanges 446 and 448 a channel 450 within which the leaf spring 452 is received, as by having its ends secured in place by appropriate bolts 454 (see Figure 18). An appropriate screw threaded rod 456 extends between the spring 452 and the plate 442, the rod 456 being adjusted to bias shaft 156 to the right of Figure 18 as may be necessary to properly tension pulley belts 152 and 160. Channel member 450 also fixedly carries the U-shaped mounting bracket 458 in which hand wheel 182 is journalled; hand wheel 182 screw threadedly engages the threaded rod 186, which, as already described, is employed to release the tension on belts 152 and 160. The arms 459 of bracket 458 provides the necessary guiding action on square bolt head 184. Plate 184 is spaced from the end of rod 456 to allow free movement of rod 456, thereby insuring that all slack is taken up in the belts.

Step up sheave shaft mounting or support plate 402 is recessed as at 402a to accommodate pulley belts 152.

The generator suspension assembly 151 of this embodiment of the invention includes four brackets 174 of the type illustrated in Figure 25 fixed as by welding to the upper sides of auxiliary channels 144. Brackets 174 are formed with upper and lower slots 460 in which the spaced pairs of upper and lower bars 462 are received that form the tracks 172. Bars 462 are secured in place by appropriate bolts 464 applied between spaced flanges 466 of the respective brackets 174.

The generator 168 is mounted on sliding generator frame 170 that comprises spaced transom forming plates 470 slotted as at 472 for engagement with tracks 172 and including extensions 474 provided with flanges 476 to which the generator is fixed in any suitable manner. The generator auxiliary shaft 164 is journalled in self-aligning bearing units 478 of any suitable type and has keyed thereto in any suitable manner the pulleys or sheaves 162. Shaft 164 is coupled to generator armature shaft 166 by a coupling 480 that is similar to coupling 350. As shown in Figures 18 and 26, the self-aligning bearing units 478 are adjustably secured to one of the plates 470 by appropriate screw threaded studs 482 (similar to that of Figure 7a) which are secured to the respective self-aligning bearing units 478 and carry nuts 483 and lock washers 483a that are adapted to be turned against the plate 470. Nuts 483b are turned against washers 483c and bearing units 478, respectively. Plates 470 are rigidly connected by spaced upper and lower pairs of bolts 484. This arrangement permits shaft 164 to be disposed and maintained in proper operating position crosswise of the tracks 172.

Spring unit 180 generally comprises an appropriate form of leaf spring 486 having its ends fixed in place by pins 488 that are fixed between bars 462, on either side of the center sill, by appropriate pins 490. A spring take up bolt 492 is interposed between adjacent plate 470 and the center of spring 486 in the manner indicated in Figure 23.

The generator suspension 151 may be installed by first fixing brackets 174 in place on underframe center sill members 142 and then bolting the lower track forming bars 462 between the brackets 174 on either side of the center sill. The spaced plates 470 then may be seated on the lower bars 462 after which the lower bolts 484 may be applied. Then the auxiliary shaft 164 together with its bearings 478, its sheaves 162 and alignment studs 482 as well as flanged coupling member 494 are applied to the lower track forming bars 462. Pins 488 may then be applied to the lower track forming members 462 after which spring 486 and bolt 492 are applied as indicated in Figure 23. The upper track forming members 462 are then bolted between the respective brackets 174, the upper ends of pins 488 then being fixed to said upper track forming bars and the upper bolts 484 applied between plates 470. The bolt 492 should be adjusted to provide the desired initial tensioning of pulley belts 160. In accordance with a specific embodiment of the invention, this spring will automatically take up 1½ inches of stretch in the belts 160, after which the bolts should be removed and replaced.

Generator 168 is applied to the plates 470 and the coupling 480 assembled to complete the installation.

In operation, the axle-generator system 140 functions in the same manner as the system 10, though the takeup pulley suspension and the generator suspension are separate assemblies. In practice, the generator suspension assembly 151 will be mounted immediately under the floor 496 of the car (see Figure 23) and the generator 168 will protrude upwardly somewhat making it advisable to dispose it under a seat or some appropriate housing structure as indicated at 498 of Figure 24. In Figure 18, one of the cross bearers of the underframe is indicated at 500 and one of the floor joists is indicated at 502.

Both of the illustrated embodiments of the invention have been designed for application to a caboose railroad car for freight trains, but it will be immediately apparent that they are just as applicable to other types of railroad cars. The generators 92 and 168 may take the form of a conventional 1.5 kw. 114 volt A.C. design made and sold by Safety Industries Inc. of New Haven, Connecticut. These generators are provided with suitable regulators so that they will generate their full voltage at low speed but which make provision for taking care of the output of the generator at higher speeds. As is well known in the art, generator regulators are generally designed to control the fluid of the generator, weakening it at high speeds and strengthening it at low speeds. When the generator voltage falls below a predetermined value, the generator is automatically disconnected by means of a reverse current relay and the load is switched to the storage batteries.

The generator design I prefer for both of the illustrated embodiments of the invention provides for a generator cut-in speed at between four and five m.p.h., which with my improved drive provides a generator armature rotation of 700 r.p.m. At about 15 m.p.h the generator provides a minimum full load speed of 1,500 r.p.m. which will allow the batteries ample support to sustain long usage. The maximum generator speed of 7,000 r.p.m. is obtained at about 80 m.p.h. and the generator regulator functions to maintain a uniform voltage output even at this high speed.

It will therefore be seen that I have provided an axle-generator system employing a novel drive that not only maintains uniform tension on the drive belts and automatically takes up slack developing in them, but also permits a packaging of the unit for easy replacement and repair. In both of the illustrated embodiments, the generator drive components may be removed individually as needed, without removing the supporting framing, or the entire installation may be removed intact.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A generator support and drive for cushion underframe railroad cars of the type having a floating center sill positioned between spaced longitudinally extending beams of the underframe, said support and drive comprising a pair of spaced generally horizontally disposed tracks secured to said longitudinally extending beams beneath the center sill, a further pair of spaced generally horizontal tracks secured to said beams above the center sill, a generator slidably mounted on said further pair of tracks and including a drive shaft extending crosswise thereof, a step-up sheave shaft slidably mounted on the first mentioned pair of tracks, said step-up sheave shaft extending crosswise of said first mentioned pair of tracks, a driving sheave keyed to an axle of the vehicle, endless connecting means trained over said driving sheave and said step-up sheave shaft, said endless connecting means engaging sheave means keyed to said step-up sheave shaft adjacent the portion thereof that underlies said center sill, further endless connecting means trained over said step-up sheave shaft and said generator shaft, said further endless connecting means engaging sheave means on said step-up sheave shaft and said generator shaft that are disposed to one side of said center sill, resilient means interposed between said generator and said car body opposing the tension of said further endless connecting means, and further resilient means interposed between said step-up sheave shaft and said body opposing the tension of the first mentioned endless connecting means.

2. A generator support and drive for cushion underframe railroad cars of the type having a floating center sill positioned between spaced longitudinally extending beams of the car underframe, said underframe being carried by trucks each including several wheeled axles, said support and drive comprising, a pair of spaced horizontally disposed tracks secured to said longitudinally extending beams and beneath the center sill, a further pair of spaced horizontal tracks secured to said beams above the center sill of the body, a generator slidably mounted on the further pair of tracks and including a drive shaft extending crosswise thereof, a step-up sheave shaft slidably mounted on the first mentioned pair of tracks, said step-up sheave shaft extending crosswise of said first mentioned pair of tracks, a pinion driving member fixed to one of the axles of one of the trucks, a driven sheave member encircling said driving member, a plurality of ball elements keying said sheave member to said driving member, one of said members being formed with a plurality of generally spherical sockets corresponding in number to the number of said ball elements, said sockets being aligned in the same plane transversely of said members, and the other of said members being formed with elongate grooves corresponding in number to the number of said ball elements and in which the respective ball elements engage, said grooves extending generally longitudinally of said one axle, said sheave member being formed with an annular recess about its periphery, a centering device fixed to said underframe beams in parallelism with the center sill, said centering device including a planar centering component received within said recess about said sheave member, endless connecting means trained over said sheave member and said step-up sheave shaft, said endless connecting means engaging sheave means keyed to said step-up sheave shaft adjacent the portion thereof that underlies said center sill, further endless connecting means trained over said step-up sheave shaft and said generator shaft, said further endless connecting means engaging sheave means on said step-up sheave shaft and said generator shaft that are disposed to one side of said center sill, resilient means interposed between said generator and said car body opposing the tension of said further endless connecting means, and further resilient means interposed between said step-up sheave shaft and said underframe opposing the tension of the first mentioned endless connecting means.

3. An axle drive for railroad cars of the type including a vehicle body pivotally connected to bolsters carried by railroad car trucks each including a wheeled axle disposed on either side of the pivotal connection between the vehicle body and the truck bolster, said drive comprising a pinion driving member adapted to be fixed to one of the axles of one of the trucks intermediate the wheels thereof, said pinion member comprising a rounded body having an axially extending bore for receiving said one axle and having its external surface convexly arcuate longitudinally of said bore and struck on a radius from the axis of the pivotal connection of said one truck to said vehicle body, said pinion body thereby being of maximum external diameter adjacent its midportion and of less diameter at its end portions, an annular sheave member adapted to be received over said pinion member and including a bore proportioned to receive said pinion member, said sheave member bore including a central portion having an internal diameter that exceeds the maximum external diameter of said pinion member, with the remaining portions of said sheave member bore tapering outwardly of the axis of said sheave member bore an amount sufficient to accommodate the forward and rearward movement of said one axle with respect to the vehicle body when the car moves over curves and crossovers, said pinion body being formed with a plurality of spherically contoured sockets arranged in diametrically opposed pairs about said pinion body, said sockets being coplanar transversely of said pinion member adjacent said midportion thereof, said bore of said sheave member being formed with elongate grooves corresponding in number and spacing to the number and spacing of said sockets, said grooves extending lengthwise of said sheave member bore and across said central portion thereof, a plurality of ball elements keying said sheave member to said pinion member, each ball element being received in the space defined by a juxtaposed groove and socket of the sheave and pinion members, respectively, said ball elements being proportioned to space said sheave and pinion members from each other about their respective bores, and means for maintaining said sheave member in parallelism with the longitudinal center of the vehicle body.

4. An axle drive for railroad cars of the type including a vehicle body pivotally connected to bolsters carried by railroad car trucks each including a wheeled axle disposed on either side of the pivotal connection between the vehicle body and the truck bolster, said drive comprising a pinion driving member fixed to on of the axles of one of the trucks at the center of said one axle, said pinion member comprising a rounded body having an axially extending bore for receiving said one axle and having its external surface convexly arcuate longitudinally of said bore and struck on a radius from the axis of the pivotal connection of said one truck to said vehicle body, said pinion body thereby being of maximum external diameter adjacent its midportion and of less diameter at its end portions, an annular sheave member received over said pinion member and including a bore proportioned to receive said pinion member, said sheave member bore including a central portion having an internal diameter that exceeds the maximum external diameter of said pinion member, with the remaining portions of said sheave member bore tapering outwardly of the axis of said sheave member bore an amount sufficient to accommodate the forward and rearward movement of said one axle and said pinion member with respect to the vehicle body when the car moves over curves and crossovers, said pinion body being formed with a plurality of spherically contoured sockets arranged in diametrically opposed pairs, said sockets being coplanar transversely of said pinion member adjacent said midportion thereof, said bore of said sheave member being formed with elongate grooves corresponding in number and spacing to the number and spacing of said sockets, said grooves extending lengthwise of said sheave member bore and across said central portion thereof, a plurality of ball elements keying said sheave member to said pinion member, each ball element being received in the space defined by a juxtaposed groove and socket of the sheave and pinion members respectively, said ball elements being proportioned to space said sheave and pinion members from each other about their respective bores, and guide means carried by the vehicle body for maintaining said sheave member in alignment with the longitudinal center of the vehicle body.

5. The drive set forth in claim 4 wherein said means for maintaining said sheave member in alignment with the longitudinal center of the vehicle body comprises a sheave member centering device secured to the vehicle body in alignment with the longitudinal center of the vehicle body, said sheave member being formed with an annular recess about its periphery, said centering device comprising a lower arcuate guide bar member received in said sheave member recess underneath said one axle, means for securing said guide bar member to the vehicle body in alignment with the longitudinal center thereof, an upper arcuate guide bar member received in said sheave member recess above and across the top of said one axle, and means for slidably keying said upper guide bar member to said lower guide bar for vertical movement with respect thereto, said guide bar members and said sheave member recess being formed with coacting wear surfaces for holding said sheave member in alignment with the longitudinal center of the vehicle body during rotation of said one shaft.

6. The drive set forth in claim 5 including a housing structure for said pinion member and said sheave member, said housing structure comprising a first arcuate structure fixed to the vehicle body on one side of said one axle, a second arcuate structure fixed to the vehicle body on the other side of said axle, said arcuate structures being proportioned to enclose said sheave structure on each side of said axle, said lower guide bar member being fixed between said housing arcuate structures in alignment with the longitudinal center of the vehicle body to form said means for securing said upper guide bar member to the vehicle body, and means for rigidly securing said arcuate structures together below said one axle.

7. A generator support and drive for railroad cars of the type including a vehicle body pivotally connected to bolsters carried by railroad car trucks each including a wheeled axle disposed on either side of the pivotal connection between the vehicle body and the truck bolster, said drive comprising a pinion driving member fixed to one of the axles of one of the trucks at the center of said one axle, said pinion member comprising a rounded body having an axially extending bore for receiving said one axle and having its external surface convexly arcuate longitudinally of said bore and struck on a radius from the axis of the pivotal connection of said one truck to said vehicle body, said pinion body thereby being of maximum external diameter adjacent its mid-portion and of less diameter at its end portions, an annular sheave member received over said pinion member and including a bore proportioned to receive said pinion member, said sheave member bore including a central portion having an internal diameter that exceeds the maximum external diameter of said pinion member, with the remaining portions of said sheave member bore tapering outwardly of the axis of said sheave member bore an amount sufficient to accommodate the forward and rearward movement of said one axle and said pinion member with respect to the vehicle body when the car moves over curves and crossovers, said pinion body being formed with a plurality of spherically contoured sockets, said sockets being coplanar transversely of said pinion member adjacent said midportion thereof, said bore of said sheave member being formed with elongate grooves corresponding in number and spacing to the number and spacing of said sockets, said grooves extending lengthwise of said sheave member bore and across said central portion thereof, a plurality of ball elements keying said sheave member to said pinion member, each ball element being received in the space defined by a juxtaposed groove and socket of the sheave and pinion members respectively, said ball elements being proportioned to space said sheave and pinion members from each other about their respective bores, said sheave member being formed with an annular recess about its periphery, guide means carried by the vehicle body and engaging in said recess for maintaining said sheave member in alignment with the longitudinal center of the vehicle body, said generator support comprising spaced generally horizontal tracks secured to the vehicle body underneath same and on either side of the longitudinal center thereof, a generator support frame slidably mounted on said tracks and including a drive shaft extending crosswise of said tracks, a generator carried by said support frame and coupled to said drive shaft, a step-up sheave shaft slidably mounted on said tracks, with said generator support frame being disposed between said one axle of said one truck and said step-up sheave shaft, sheave means keyed to said shafts respectively, spring means interposed between said generator frame and said step-up sheave shaft, further spring means interposed between said generator frame and said vehicle body on the other side of said generator frame, means for adjustably fixing said step-up sheave shaft against displacement longitudinally of said tracks, said spring means acting to bias said generator frame and said step-up sheave shaft away from said sheave member and said one axle, endless connecting means trained over said sheave member and said step-up sheave shaft sheave means, and endless connecting means trained over said step-up shaft sheave means and said generator shaft sheave means.

8. In railroad vehicles including a body mounted on bolsters carried by trucks each including several wheeled axles, a generator support and drive therefor comprising spaced generally horizontal tracks adapted to be secured beneath the vehicle body, said tracks being fixed to spaced hanger elements that rigidly hold said tracks in parallel spaced relation, said tracks and said hanger elements forming a rigid unitary frame, spaced brackets adapted to be fixed to the vehicle body for suspending said frame, means for releasably securing said frame to said brackets, a generator slidably mounted on said tracks adjacent one of said hanger elements and including a drive shaft extending crosswise of said tracks, a step-up sheave shaft slidably mounted on said tracks adjacent the other of said hanger elements to one side of and spaced from said generator, said step-up sheave shaft extending crosswise of said tracks, endless connecting means adapted to be trained over a driving sheave keyed to one of the axles of one of the trucks on the other side of the generator and said step-up sheave shaft, further endless connecting means adapted to be trained over said step-up sheave shaft and said generator drive shaft, compression spring means interposed between said generator and said step-up sheave shaft, compression spring means interposed between said generator and said one hanger element, said resilient means acting to bias said generator and said step-up shaft away from the driving sheave, and means for adjustably fixing said step-up sheave shaft against displacement longitudinally of said tracks under the action of said spring means.

9. The generator support and drive set forth in claim 8 wherein said tracks are excised short of said other hanger element to permit removal of said step-up sheave shaft and said generator without removing said frame from said brackets.

References Cited in the file of this patent

UNITED STATES PATENTS

| | | |
|---|---|---|
| 604,101 | Wilhelm et al. | May 17, 1898 |
| 683,968 | Moskowitz | Oct. 8, 1901 |
| 760,713 | Turbayne | May 24, 1904 |
| 872,638 | Berner | Dec. 3, 1907 |
| 1,454,657 | Smith | May 8, 1923 |
| 1,628,491 | Crawford | Nov. 10, 1927 |
| 2,053,983 | Whitsitt | Sept. 8, 1936 |
| 2,181,406 | Madden | Nov. 28, 1939 |
| 2,497,785 | Melcher | Feb. 14, 1950 |

FOREIGN PATENTS

| | | |
|---|---|---|
| 523,271 | France | Apr. 18, 1921 |